(12) United States Patent
Olijnyk et al.

(10) Patent No.: US 6,505,943 B1
(45) Date of Patent: Jan. 14, 2003

(54) RETRACTION AND EXTENSION MECHANISM FOR A VEHICLE REAR VISION MIRROR

(75) Inventors: Mark Olijnyk, Hallett Cove (AU); Gary Gordon Leslie Fimeri, Morphet Vale (AU); Paul Van De Loo, Norton Summit (AU); Simon Orme, Hallett Cove (AU)

(73) Assignee: Schefenacker Vision Systems Australia Pty Ltd. (AU)

( * ) Notice: Subject to any disclaimer, the term of this patent is extended or adjusted under 35 U.S.C. 154(b) by 0 days.

(21) Appl. No.: 09/890,622

(22) PCT Filed: Feb. 9, 2000

(86) PCT No.: PCT/AU00/00077

§ 371 (c)(1),
(2), (4) Date: Aug. 13, 2001

(87) PCT Pub. No.: WO00/47446

PCT Pub. Date: Aug. 17, 2000

(30) Foreign Application Priority Data

Feb. 9, 1999 (AU) .............................................. PP 8560

(51) Int. Cl.⁷ .............................. G02B 5/08; G02B 7/18
(52) U.S. Cl. ....................... 359/841; 359/881; 248/900
(58) Field of Search ................................. 359/841, 872, 359/873, 877, 881; 248/900

(56) References Cited

U.S. PATENT DOCUMENTS

| | | | | | |
|---|---|---|---|---|---|
| 3,937,563 A | * | 2/1976 | Frabe | ........................ | 248/480 |
| 4,558,930 A | * | 12/1985 | Deedreek | .................... | 248/480 |
| 4,936,670 A | * | 6/1990 | Yoo | ........................... | 248/480 |
| 5,039,055 A | | 8/1991 | Lempelius | ................. | 248/480 |
| 5,864,438 A | * | 1/1999 | Pace | .......................... | 359/841 |
| 6,213,609 B1 | * | 4/2001 | Foote et al. | ................ | 248/900 |
| 6,325,518 B1 | * | 12/2001 | Whitehead et al. | ......... | 248/478 |

FOREIGN PATENT DOCUMENTS

AU 30548/84 1/1984

* cited by examiner

Primary Examiner—Mark A. Robinson
(74) Attorney, Agent, or Firm—Warn, Burgess & Hoffmann, P.C.

(57) ABSTRACT

This invention relates to a retraction and extension mechanism for extending or retracting a set of telescopic supports that connect a mirror head (10) to a mirror mounting bracket (11). It comprises a mirror mounting bracket (11) with a first tube (18) projecting from the mounting bracket (11). The mirror head (10) has a support (19) projecting from it that locates into and slides back and forth within the first tube (18). A roller (34) is mounting with respect to the support (19) and cable (29) is attached at one end with respect to the first tube (18) and a point between the roller (34) and the mirror head (10). It extends to and around the roller (34) and into the mirror head (10). The other end of the cable (29) extends into and is attached with respect to the first tube (18). A capstan (31) is located within the mirror head (10) and engages the cable (29). A motor (47) drives the capstan (31) in either direction to cause the mirror head (10) to extend or retract with respect to the mirror mounting bracket (11).

32 Claims, 4 Drawing Sheets

RETRACTION AND EXTENSION MECHANISM FOR A VEHICLE REAR VISION MIRROR

This invention relates to the extension or retraction of telescopic supports that are used to secure the mirror head of a rear vision mirror to a mounting bracket on a motor vehicle.

BACKGROUND OF THE INVENTION

Although one application is with a rear vision mirror assembly, it should be realised that the invention should not be restricted to this particular application, as it will be suited to other applications. However, for ease of description, the invention will be described in relation to this application.

It is desirable to be able to move the mirror head, which holds the mirror, with respect to the mounting bracket on the motor vehicle in towards or away from the mounting bracket.

This enables the mirror head to be either positioned close to the side of the motor vehicle, or to be extended away from the motor vehicle to provide an increased field of view. A rear view may be obstructed by a vehicle body, a load on the vehicle, or a trailer that is being towed. In many of these instances, extending the mirror head outwardly will provide a increased field of view behind the vehicle.

Accordingly, it is an aim of the invention to provide a mechanism to extend or retract telescopic supports.

It is a further object of this invention to provide a means whereby a mirror head can be both manually or automatically moved towards or away from the mounting bracket of a motor vehicle mirror.

SUMMARY OF THE INVENTION

According to one aspect, the invention is a retraction and extension mechanism for extending or retracting a set of telescopic supports that connect a mirror head to a mirror mounting bracket comprising:
 a mirror mounting bracket,
 a mirror head,
 a first tube projecting from said mounting bracket,
 a support projecting from said mirror head that locates into and slides back and forth within said first tube,
 a roller mounted with respect to said support,
 a cable, attached at one end with respect to said first tube at a point between said roller and said mirror head, and extending to and around said roller and into said mirror head, the other end of said cable extending into and attached with respect to said first tube,
 a capstan within said mirror head engaging said cable, and
 a motor to drive said capstan in either direction to cause said mirror head to extend or retract with respect to said mirror mounting bracket.

The support may also comprise a tube and more than one set of telescopic first and second tubes may be used to mount the mirror head to the mirror bracket.

Preferably, a pair of first and second tubes are used, with one set of first and second tubes being located above the other set. A first cable extends from a connector in the upper tube set into the mirror head, around the capstan and into the lower set of first and tubular arms, around a roller in the end of the second tube in the lower set and back to a connector. A second cable extends from the other side of the lower connector into the mirror head, around at least one idler pulley and then into the upper set of first and second tubes. The end of this second cable is attached to the connector in the upper set via a roller that is mounted in the end of the second tube of the upper set. Movement of the first cable by the capstan will result in movement of the mirror head either towards or away from the mounting bracket. This will be described in more detail below in respect of a preferred embodiment.

Further, the invention may comprise a drive means for a cord comprising: a pair of contra rotating capstans that are rotatably mounted to a motor housing, said cable engaging with said capstans so that, with respect to each direction of movement of said cable through said drive means, the cable moves around the axis of one capstan in a direction opposite to that of the other capstan,
 a pivot that allows said motor housing to rotate about an axis which is parallel to the axis of rotation of each of the capstans so that the extent of contact between the cable and the periphery of each capstan can be varied, and
 torsion means acting with respect to said motor housing and pivot that acts to rotate said motor housing and to increase the extent of contact of said cable with respect to the periphery of each said capstan.

Preferably, the pivot is located equally distant between the axis of rotation of each capstan. This ensures that the extent of rotation of the axis of each capstan around the pivot is the same.

The torsion means may comprise either a torsion spring concentric with the pivot, or a coil spring fixed at one end with respect to the mirror head and attached to the motor housing at the other. The torsion means acts to rotate the motor housing in a direction which increases the extent of cable which is in contact with the periphery of each of the capstans. The torsion means is required to maintain at least a minimum degree of contact to ensure adequate drive connection between each of the capstans and the cable. If the extent of contact between the cable and the capstans becomes less than the minimum, then the cable will slip with respect to each of the capstans.

In one aspect of the invention, this is quite useful. If movement of the cable is prevented for whatever reason, then continued rotation of the capstans will tend to rotate the motor housing so that the extent of engagement between the cable and each of the capstans is reduced. This rotation, against the torsion means, will continue until the capstans start slipping with respect to the cable. At this point, the motor housing will cease rotating while maintaining sufficient force to act against the torsion means, and to thereby prevent any overload or stalling of the capstans. It will also be useful if the mirror head is moved manually. This will also cause rotation of the motor housing and result in slipping of the cable.

Preferably, one of the capstans is driven by an electric motor via reduction gearing, and the other capstan is driven via engaging ring gears that are on each of the capstans. This results in the contra rotation of the capstans.

The cable used on both the means for moving the mirror head and the drive means may comprise in a cord, belt or any other form of flexible cord. In addition, multiple cables may be used to produce a series of parallel cables that, together, act as a single cable.

As an alternative to contra rotating capstans, a single driven capstan may be used. The capstan may be spring loaded, or arranged in some other manner, so that it is pushed into the cable. The resultant angle of wrap must be sufficient to enable drive force to be applied to the cable. Any resistance to movement or any manual movement of the mirror head will result in deflection of the spring and slippage of the cable over the capstan.

A further alternative for the drive means may be a capstan in combination with a clutch. The clutch is designed to disengage upon manual movement or any resistance to movement being encountered.

In a second aspect, the invention is a retraction and extension mechanism for extending or retracting telescopic supports that connects a mirror head to a mirror mounting bracket comprising:

at least one first tube attached at one end to, and projecting from, said mirror mounting bracket, at least one support attached to and projecting from said mirror head, that locate into and slide back and forth within a said first tube, at least one wheel secured with respect to said support, the periphery of said wheel engaging against said first tube, and drive means for rotating said wheel in either direction to move said first tube and support with respect to each other to cause said mirror head to extend or retract with respect to said mirror mounting bracket.

Preferably, the support comprises a tube and a pair of first and second tubes are used with one set of first and second tubes being located above the other set. The wheel and associated drive means may be located in one of the sets, or alternatively a wheel with associated drive means may be located in each of the sets of first and second tubes.

Preferably, the mounting of the wheel within one of the tubes includes a means of forcing the periphery of the wheel against one of the tubes. This may include a mounting which enables the wheel to move in a direction that is normal with respect to its axis of rotation and a spring means which pushes the wheel in the required direction.

Preferably, the wheel is mounted with respect to the tube which is located internally of the other tube. An aperture may be provided within the internal tube to enable the periphery of the wheel to locate against the outer tube.

In addition to the use of one wheel, two or more wheels may be used to provide the necessary drive force.

In addition to providing drive force, another function performed by the wheels will be to hold the mirror head in the required position while at the same time allowing manual movement of the mirror head without operation of the drive means. The friction force acting between the periphery of the wheel and one of the tubes must be sufficient to enable the wheel to move the mirror head. In addition, when the wheel is stationary, the applied force and resultant friction is high enough to prevent unwanted movement of the mirror head. The necessary force that will achieve these aims is not so large that it prevents manual movement of the mirror head. Manual movement will result in slippage of the wheel with respect to one of the tubes. Accordingly, with this invention, it is possible to manually move the mirror head to an extended or retracted position.

The wheel or wheels may be electrically driven, and the drive means preferably comprises an electric motor and drive pulley that is located within the mirror head and a cable which extends from the pulley into the telescopic tubes and that engages the wheel so as to cause it to rotate.

The cable within the telescopic tubes may either locate around the periphery of the wheel or some other element of the wheel which causes it to rotate. Alternatively, a pair of spaced wheels may have the cable located around them with an idler pulley, positioned between the pair of wheels, that pushes against the cable and in turn causes the cable to push against the pair of wheels. The pair of wheels may be slidably mounted with respect to their pivot to enable movement normal to the axis of the pivot to thereby cause the periphery of the wheels to bear against the inside surface of one of the tubes.

In order to fully understand the invention, a preferred embodiment will now be described, however it should be realised that the scope of this invention is not to be confined or restricted to the precise features of the embodiment.

DESCRIPTION OF THE DRAWINGS

The embodiment is illustrated in the accompanying illustrations in which.

DETAILED DESCRIPTION OF THE PREFERRED EMBODIMENTS

Figure 1:
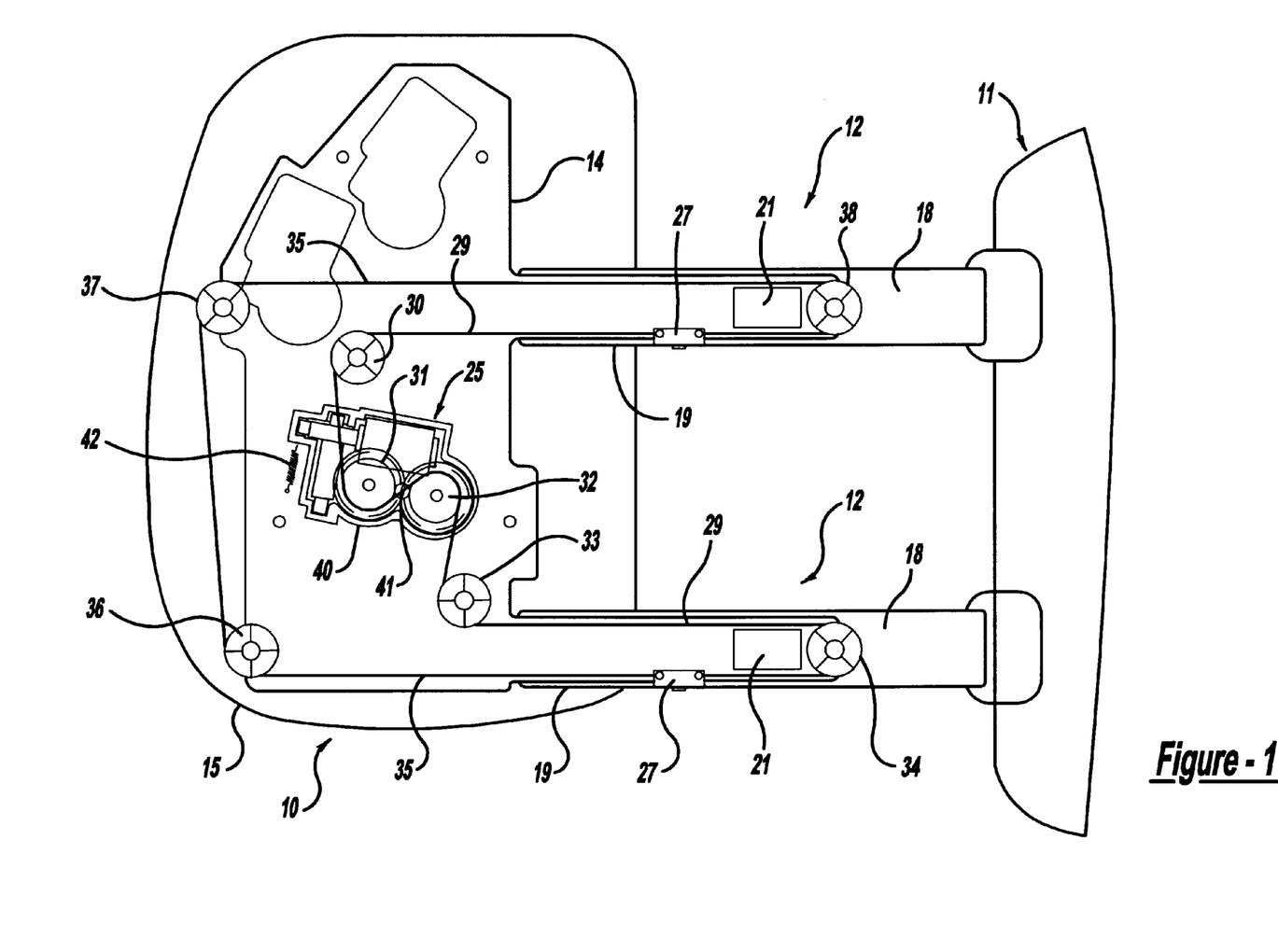
FIG. 1 shows a schematic view of a mirror head, mounting bracket and location of drive means with associated cable according to a first embodiment.

Referring to FIG. 1, a rear view mirror assembly according to a first embodiment comprises a mirror head 10, a mounting bracket 11 and a upper and lower set of telescopic tubes 12 and 13 respectively. The mounting bracket 11 is attached to the side of the motor vehicle, and versions of the invention will be produced that are suited to both left and right side applications.

The mirror head 10 carries the rear view mirror. The tilt of the mirror is controllable about a vertical and horizontal axis by electric motors that are commonly known and used in this industry. The mirror head 10 comprises an assembly of a sub-frame 14 to which a moulded cover 15 is secured.

The telescopic tube sets 12 and 13 each comprise a first tube 18 that is secured at one end to the mounting bracket 11. The other end of each first tube 18 locates through apertures within the moulded cover 15.

Supports, which comprise second tubes 19, are secured at one end to the sub-frame 14 and extend through the centre of each respective first tube 18. The engagement of the first and second tubes 18 and 19 in this manner enable the telescopic movement of the tube sets 12 and 13, thereby enabling the mirror head 10 to move toward or away from the mounting bracket 11.

Friction pads 21 are generally drawn in FIG. 1, and comprise spring loaded pads that exert pressure between the first and second tubes 18 and 19 to prevent unwanted vibration of the mirror head 10 with respect to the mounting bracket 11. The friction pads also prevent unwanted movement of the telescopic tube sets 12 and 13.

FIG. 1 illustrates a series of cables (referred to in more detail below) and a drive means 25 which are used to cause movement of the mirror head 10 with respect to the mounting bracket 11.

Firstly, connectors 27 are secured to each of the outer tubes 18. Each of the connectors 27 project through elongate slots within the inner tube 19 to allow the necessary movement of the inner tube 19 with respect to the outer tube 18. A first cable 29 is attached to the upper connector 27 and extends from the connector 27 into the moulded cover 15 of the mirror head 10. The first cable 29 extends around an idler pulley 30 and then engages contra rotating capstans 31 and 32 of the drive means 25. The first cable 29 extends around another idler pulley 33 that is mounted on the sub-frame 14 and a roller 34 that is mounted to the end of the lower second tube 19. The first cable 29 is then connected to the lower connector 27.

A second cable 35 is attached to the lower connector 27 and extends into moulded cover 15 of the mirror head 10 and around idler pulleys 36 and 37. The second cable 35 then extends around roller 38 located at the end of the upper inner tube 19 and is then attached to the upper connector 27.

The motor housing 40 of the drive means 25 has a pivot 41 which connects the drive means 25 to the sub-frame 14. This enables rotation of the motor housing 40 about the pivot 41. A spring 42 is secured at one end to the sub-frame 14, and at the other end to the motor housing 40. The spring 42 acts as a torsion means and tends to cause the motor housing 40 to rotate in an anti-clockwise direction as shown in FIG. 1. This tends to increase the extent of contact between the periphery of each of the contra rotating capstans 31 and 32 and the first cable 29. In addition, it acts to maintain the required tension within the first and second cables 29 and 35.

Operation of the drive means 25 will cause the mirror head 10 to either move away from or towards the mirror mounting bracket 11.

In order to make the mirror head 10 move towards the mounting bracket 11, the drive means 25 is operated so that contra rotating capstan 31 is rotated in an anti-clockwise direction. This in turn reduces the length of the first cable 29 and shortens the distance between the idler pulley 30 and the upper connector 27. As the upper connector 27 is fixed with respect to the mounting bracket 11, which means the mirror head 10 will move towards the mounting bracket 11.

As the length of the first cable 29 between the idler pulley 30 and connector 27 is being shortened, the length of the first cable 29 between idler pulley 33 and roller 34 is being lengthened. This enables the inner tube 19 carrying the roller 34 to move towards the mounting bracket 11.

The movement of the inner tube 19 carrying roller 38 towards the mounting bracket 11 results in movement of the second cable 35. As the roller 38 moves away from the upper connector 27, a force results between pulley 36 and the lower connector 27. The change in length of the second cable 35 between the upper connector 27 and roller 38 results in a shortening of the second cable 35 between the pulley 36 and lower connector 27. This in turn acts in a similar manner to the shortening of the first cable 29 between the upper connector 27 and the pulley 30 and results in the inner tube 19 and therefore mirror head 10 moving closer to the mounting bracket 11.

In order to move the mirror head in the opposite direction away from the mounting bracket 11 the direction of the contra rotating capstans 31 and 32 are reversed so that the contra rotating capstan 32 rotates in an anti-clockwise direction. This results in the length of the first cable 29 between roller 34 and pulley 33 being reduced which causes the mirror head 10 to move away from the mounting bracket 11. Consistent with the description of the mirror head 11 moving inwardly, the length of the first cable 29 between the pulley 30 and the upper connector 27 increases with a resultant corresponding change in the various lengths of the second cable 35.

Figure 2:
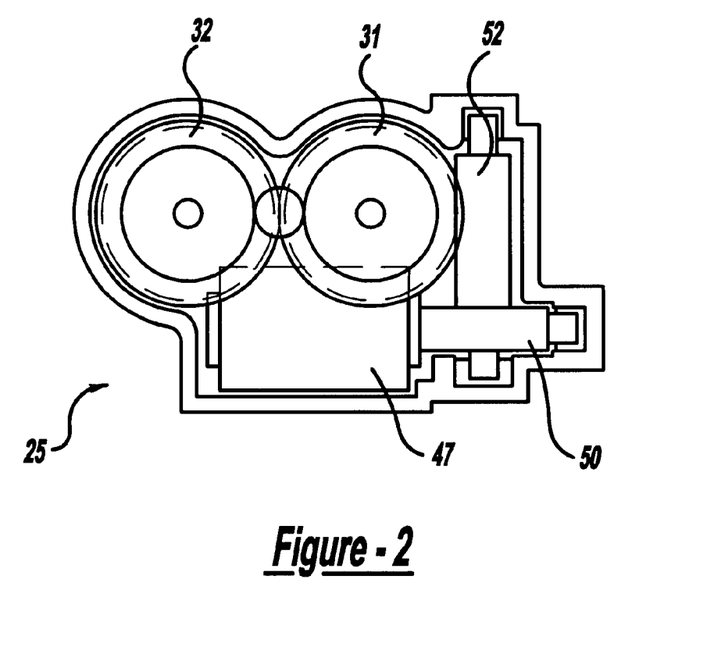
FIG. 2 shows a top view of a drive means illustrated in FIG. 1.
Figure 3:
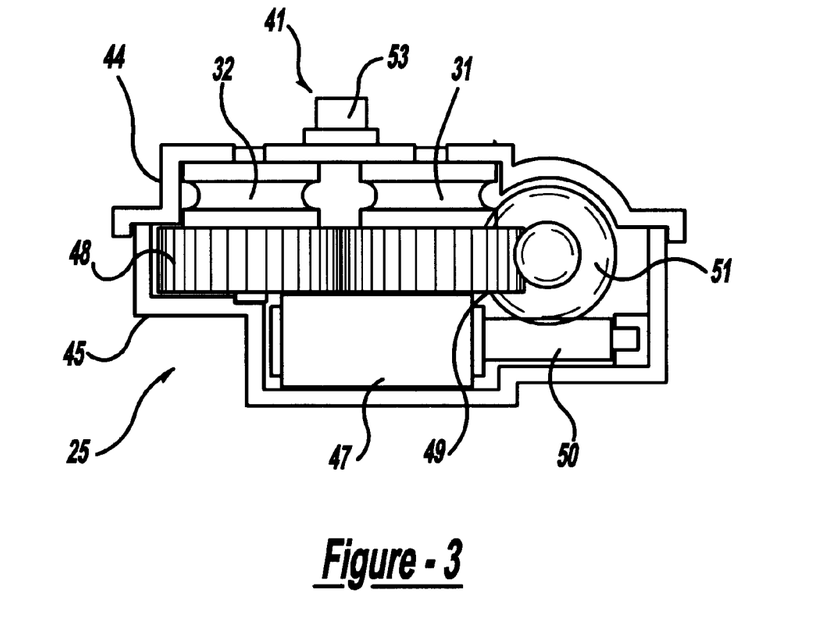
FIG. 3 shows a side view of a drive means illustrated in FIG. 1.

The drive means of the first embodiment is illustrated in FIGS. 2 and 3. The drive means 25 comprises an upper and lower casing 44 and 45 which hold the contra rotating capstans 32 and 31 and electric motor 47 with its associated drive gears.

The contra rotating capstans 31 and 32 are moulded components that incorporate both the capstans 31 and 32 together with drive gears 48 and 49. Respective capstans 31 and 32 and drive gears 48 and 49 rotate about a common axis and are journalled with respect to the upper and lower casings 44 and 45 so that the drive gears 48 and 49 mesh. Accordingly, rotation of the first capstan 31 will cause the second capstan 32 to rotate in the opposite direction.

The drive motor 47 drives a first worm drive 50 which drives a gear 51 of a second worm drive 52. The second worm drive 52 drives the drive gear 49 of capstan 31.

As seen in FIG. 1, the first cable 29 loops around capstan 31 in one direction and in the opposite direction around capstan 32. The drive means 25 is pivotally mounted to the sub-frame 14 via a pivot 41 which comprises a pivot post 53. A spring 42 is used to control the angle of wrap of the first cable 29 around each of the capstans 31 and 32. By ensuring sufficient wrap of the first cable 29 around the capstans 31 and 32, sufficient drive force can be imparted to the first cable 29 to cause movement of the mirror head 10.

If the mirror head 10 becomes jammed, either when it is moving inwardly or outwardly, or if the mirror head 10 is moved manually either inwardly or outwardly, the drive means 25 will tend to rotate about pivot 41 so that the degree of wrap around the capstans 31 and 32 of the first cable 29 reduces sufficiently to enable it to slip with respect to the capstans 31 and 32.

If the mirror head becomes jammed as it is being driven in either direction, the first cable 29 will become stationary, and the contra rotating capstans 31 and 32 will cause the drive means 25 to rotate about its pivot 53. This will in turn act to reduce the angle of wrap of the first cable 29 around the capstans 31 and 32. This results from the spacing of pulley 30 on a first side of the drive means 25 and with pulley 33 positioned on the other side of the drive means 25. Once the angle of wrap reduces sufficiently, then the cable 29 will slip with respect to the drive means 25.

If the mirror head 10 is being moved manually inwardly, the first cable 29 will be attempting to lengthen itself between capstans 32 and 34. Because of the positioning of pulley 33 to the right of the pivot 53, sufficient force will be applied to rotate the drive means 25 in a clockwise direction about pivot 53. This in turn will reduce the angle of wrap around both capstans 31 and 32 and will enable slippage of the first cable 29.

Alternatively, if the mirror head 10 is being pulled outwardly, the length of the first cable 29 between the upper connector 27 and capstan 31 will be increasing. Initially, the force applied by this section of the first cable 29 will cause the drive means 25 to rotate in a clockwise direction as a result of the pulley 30 being located to the left of the pivot 53. Again, this rotation will continue until the angle of wrap around both capstans 31 and 32 reduce sufficiently to enable slippage of the first cable 29.

Accordingly, the embodiments shown in FIG. 1 will enable the mirror head 10 to be moved electrically by the drive means 25 while at the same time providing an override mechanism that will enable manual movement or effective disengagement of the drive means 25 should the mirror head become jammed.

Figure 4:
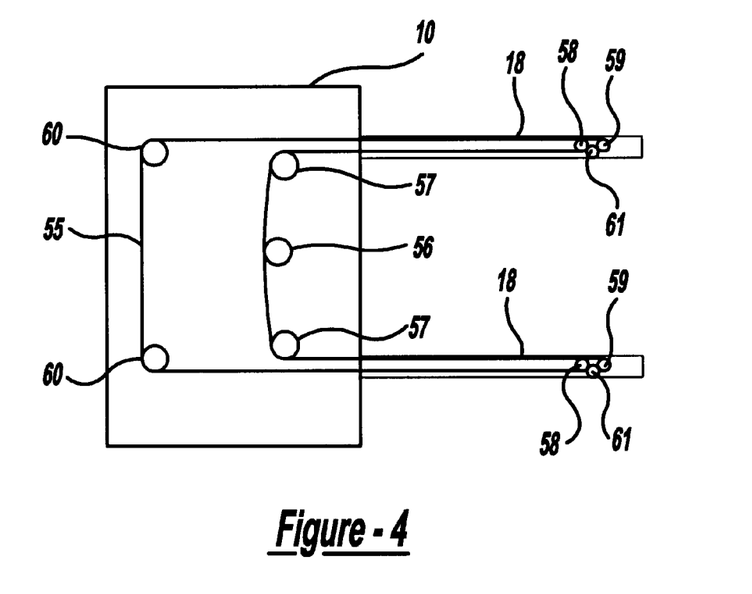
FIG. 4 shows a schematic view of a mirror head, mounting bracket and drive means according to a second embodiment of this invention.
Figure 5:
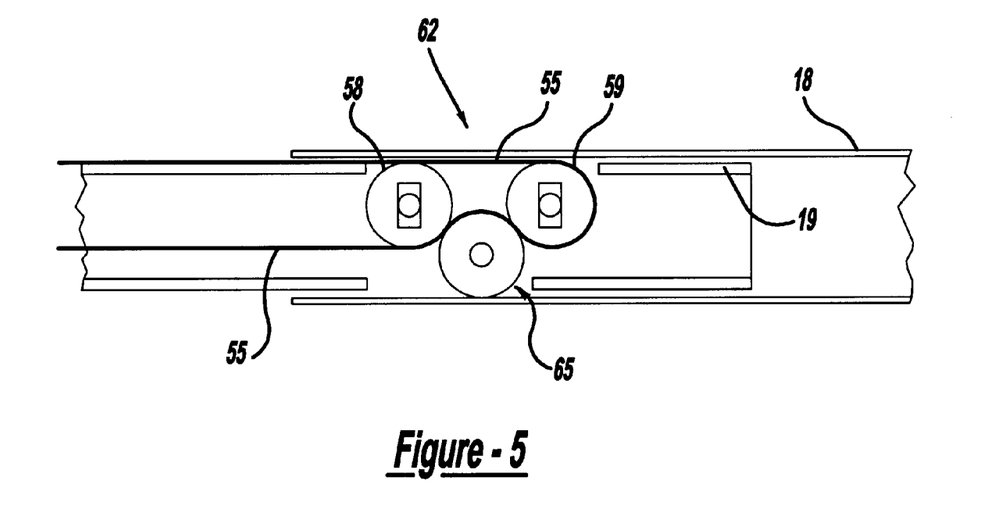
FIG. 5 shows a part schematic view of wheels and drive means in accordance with a second embodiment.

A second embodiment of the invention is illustrated in FIGS. 4 and 5. FIG. 4 shows a schematic representation of the mirror head 10 and to first tubes 18. A single cable 55 is wrapped at least once around a drive pulley 56 and extends into the combined first and second tubes 18 and 19 via pulleys 57. The cable 55 engages wheels 58, 59 and 61. The returned side of the cable 55 locates around pulleys 60.

The features of the invention shown in FIG. 4 are largely the same as those shown in FIG. 1. The embodiment includes a subframe 14 with attached second tubes 19, outer tubes 18 which are also attached to a mounting bracket 11 (not drawn). Pulleys 56, 57 and 60 are secured to the sub-frame 14.

The drive pulley 56 is preferably driven by a small DC motor in combination with a worm drive and gear to provide sufficient drive torque to pulley 56. In addition, the drive pulley 56 is slidably mounted with respect to the sub-frame 14, and a preloaded spring applies a force between the subframe 14 and the drive pulley 56. This results in a pre-load or tension being applied to the cable 55. Pulleys 57 and 60 are idler pulleys, and are used to route a cable 55 into and out of the second tubes 19.

The wheels 58, 59 and 61 are illustrated in more detail in FIG. 5. Each of the wheels 58 and 59 are rotatably mounted with respect to the inner tube 19 so that they are able to move normal to their axis of rotation. A pulley 61, which is also fixed with respect to the inner tube 19 acts on the cable 55 between the wheels 58 and 59. The tension in the cable 55 results in an outward force being applied by the cable to each of the wheels 58 and 59. The cable 55 preferably locates in a groove in the periphery of each wheel 58, 59 and 61, and one length of the cable 55 may pass between the inner and outer tubes 19 and 18.

An aperture 62 is provided in the inner tube 19 through which the wheels 58 and 59 project so as to enable engagement against the inside surface of the outer tube 18. An aperture 65 in the inner tube 19 is provided through which the wheel 61 projects to enable contact with the tube 18. The tension in the cable 55 as a result of the positioning of pulley 61 results in the wheels 58 and 59 bearing firmly against the inside surface of the tube 18. The force applied by wheels 58 and 59 cause the tube 18 to bear against wheel 61. The resultant friction force will enable the wheels 58, 59 and 61 when rotated, to move the inner tube 19 with respect to the outer tube 18, or when the mirror head 10 is manually moved, to slip with respect to the inner surface of the outer tube 18. Accordingly, if the mirror head 10 is moved manually, the wheels will not cause the cable 55 to back drive the drive pulley 56 and will enable inward or outward movement of the mirror head 10 as a result of the wheels 58, 59 and 61 slipping with respect to the outer tube 18. Movement of the cable 55 will rotate the wheel 61 in the opposite direction to the wheels 58 and 59. This results in the required motive force being applied to the tube 18.

The force applied by the wheels 58, 59 and 61 to the outer tube 18 will also act to hold the mirror head in position under normal operating loads. Accordingly, vibration within acceptable limits will not result in the mirror head 10 moving.

Figure 6:
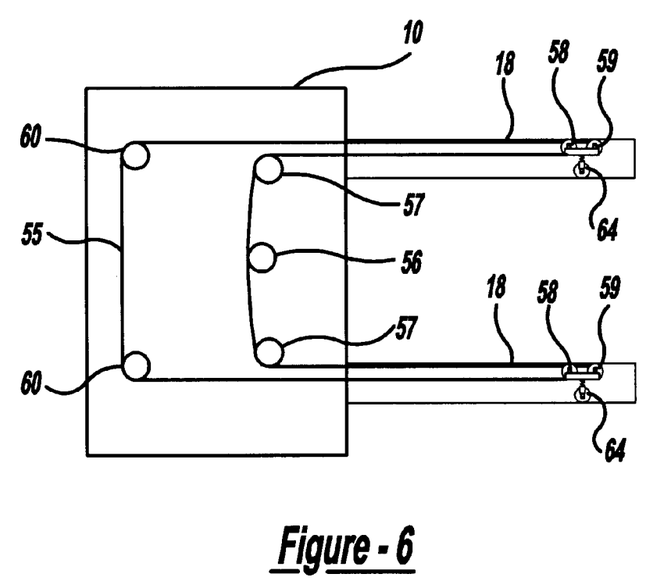
FIG. 6 shows a schematic view of a mirror head, mounting bracket and location of drive means according to a third embodiment.
Figure 7:
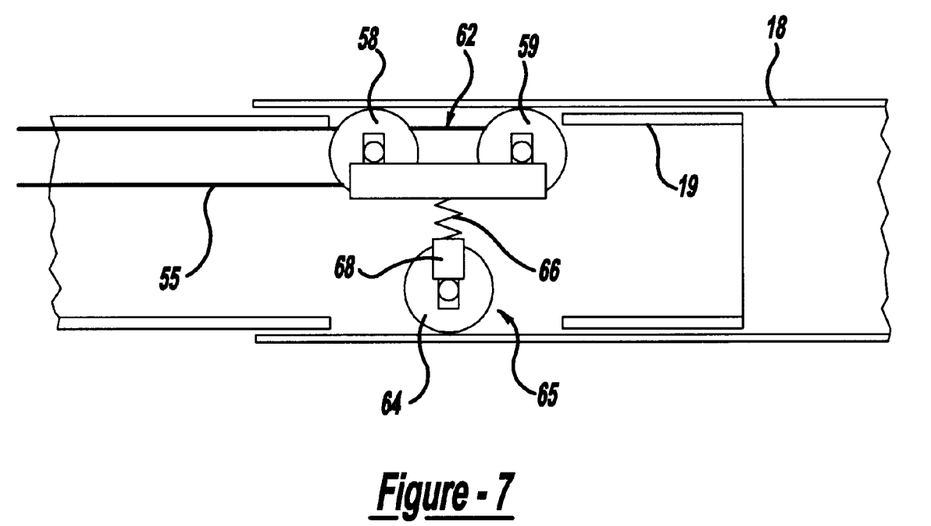
FIG. 7 shows a part schematic view of wheels and drive means used in the third embodiment.

A third embodiment is illustrated in FIGS. 6 and 7. The arrangement shown in FIG. 6 is substantially the same as that shown in FIG. 4, the only difference being the arrangement of wheels 58 and 59. This difference is illustrated in FIG. 7.

In this embodiment, a third wheel 64 extends through a second aperture 65 so that it bears against the inside surface of the outer tube 18. A pretension spring 66 applies a force between a mount 67 to which the wheels 58 and 59 are attached and a mount 68 to which the third wheel 64 is attached. The spring 66 is selected so that the wheels 58, 59 and 64 apply sufficient force to the inside surface of the outer tube 18. As in the second embodiment, the wheels 58,59 and 64 are pivotally mounted with respect to the inner tube 19, but are able to move normally with respect to their axis of rotation so that force provided by the spring 66 can be transferred to the inner surface of the outer tube 18.

In both the second and third embodiments, the cable 55 engages the wheels 58 and 59 so that they are rotated as the cable 55 is moved by the drive pulleys 56. Upon operation of the electric motor that rotates the drive pulley 56, the wheels 58 and 59 rotate in the same direction and either move the inner tube 19 inwardly or outwardly with respect to the outer tube 18.

As will be seen from the above descriptions, the three embodiments provide a simple and effective means of automatically moving telescopic tubes with respect to one another. The invention will have particular application in relation to rear view mirrors, however the invention will be equally suited to other applications involving the movement of telescopic tubes.

The claims defining the invention are as follows:

1. A retraction and extension mechanism for extending or retracting a set of telescopic supports that connect a mirror head to a mirror mounting bracket comprising:
   a mirror mounting bracket,
   a mirror head,
   a first tube projecting from said mounting bracket,
   a support projecting from said mirror head that locates into and slides back and forth within said first tube,
   a roller mounted with respect to said support,
   a cable, attached at one end with respect to said first tube at a point between said roller and said mirror head, and extending to and around said roller and into said mirror head, the other end of said cable extending into and attached with respect to said first tube,
   a capstan within said mirror head engaging said cable, and
   a motor to drive said capstan in either direction to cause said mirror head to extend or retract with respect to said mirror mounting bracket.

2. A retraction and extension mechanism according to claim 1 wherein said support comprises a second tube.

3. A retraction and extension mechanism according to claim 1 wherein the end of said first tube locates within said mirror head in its fully extended position.

4. A retraction and extension mechanism according to claim 1 further comprising a connector attached to said first tube, each end of said cable attached to said connector.

5. A retraction and extension mechanism according to claim 1 further comprising a motor housing within which said motor locates, said motor housing secured within said mirror head.

6. A retraction and extension mechanism according to claim 5 further comprising a pair of capstans that counter rotate with said cable wrapping around a first said capstan in one direction and the other said capstan in an opposite direction to the first said capstan.

7. A retraction and extension mechanism according to claim 6 wherein said cable engages only part of the periphery of said first capstan and engages only part of the periphery of said other capstan.

8. A retraction and extension mechanism according to claim 7 wherein said motor housing is pivotally attached to said mirror head and further comprising a spring acting between said mirror head and said motor housing that acts to tension said cable and maintain the required degree of engagement of said cable around said capstans to prevent slippage of said cable with respect to said capstans.

9. A retraction and extension mechanism according to claim 8 wherein said motor housing is caused to rotate against said spring should the movement of said mirror head be impeded.

10. A retraction and extension mechanism for extending or retracting telescopic supports that connect a mirror head to a mirror mounting bracket comprising:
- a pair of spaced parallel first tubes, each attached at one end to, and projecting from, said mirror mounting bracket,
- a pair of spaced parallel supports, each attached to and projecting from said mirror head, that locate into and slide back and forth within said first tube,
- a roller mounted with respect to one of said supports,
- a cable attached at one end with respect to said first tube within which said roller locates at a point between said roller and said mirror head, that extends to and around said roller and into said mirror head, the other end of said cable extending into and attached with respect to the other said first tube,
- a capstan within said mirror head engaging said cable, and
- a motor to drive said capstan in either direction to cause said mirror head to extend or retract with respect to said mirror mounting bracket.

11. A retraction and extension mechanism according to claim 10 wherein said support comprises a second tube.

12. A retraction and extension mechanism according to claim 10 wherein the end of said first tube locates within said mirror head in its fully extended position.

13. A retraction and extension mechanism according to claim 10 further comprising a connector attached to said first tube, each end of said cable attached to said connector.

14. A retraction and extension mechanism according to claim 10 further comprising a motor housing within which said motor locates, said motor housing secured within said mirror head.

15. A retraction and extension mechanism according to claim 14 further comprising a pair of capstans that counter rotate with said cable wrapping around a first said capstan in one direction and the other said capstan in an opposite direction to the first said capstan.

16. A retraction and extension mechanism according to claim 15 wherein said cable engages only part of the periphery of said first capstan and engages only part of the periphery of said other capstan.

17. A retraction and extension mechanism according to claim 16 wherein said motor housing is pivotally attached to said mirror head and further comprising a spring acting between said mirror head and said motor housing that acts to tension said cable and maintain the required degree of engagement of said cable around said capstans to prevent slippage of said cable with respect to said capstans.

18. A retraction and extension mechanism according to claim 17 wherein said motor housing is caused to rotate against said spring should the movement of said mirror head be impeded.

19. A retraction and extension mechanism for extending or retracting telescopic supports that connect a mirror head to a mirror mounting bracket comprising:
- a pair of spaced parallel first tubes, each attached at one end to, and projecting from, said mirror mounting bracket,
- a pair of spaced parallel supports, each attached to and projecting from said mirror head, that locate into and slide back and forth within said first tubes,
- a roller mounted with respect to each of said supports,
- a first cable attached at one end with respect to one of said first tubes at a point between said roller and said mirror head, that extends into said mirror head, the other end of said first cable extending into the other said first tube, around said roller in the other said first tube and fixed to the other said first tube at a point between said roller and said mirror head,
- a second cable attached at one end to said one of said first tubes, at a point between said roller and said mirror head, and extending to and around said roller and into said mirror head, the other end of said second cable extending into and attached with respect to said other said first tube,
- a capstan within said mirror head engaging said first cable, and
- a motor to drive said capstan in either direction to cause said mirror head to extend or retract with respect to said mirror mounting bracket.

20. A retraction and extension mechanism according to claim 19 further comprising idler pulleys within said mirror head engaged by said second cable.

21. A retraction and extension mechanism according to claim 20 further comprising roller pulleys within said mirror head engaged by said first cable.

22. A retraction and extension mechanism according to claim 19 wherein said support comprises a second tube.

23. A retraction and extension mechanism according to claim 19 wherein the end of said first tube locates within said mirror head in its fully extended position.

24. A retraction and extension mechanism according to claim 19 further comprising a connector attached to each said first tube, respective ends of said first and second cables attached to a respective connector.

25. A retraction and extension mechanism according to claim 19 further comprising a motor housing within which said motor locates, said motor housing secured within said mirror head.

26. A retraction and extension mechanism according to claim 25 further comprising a pair of capstans that counter rotate with said first cable wrapping around a first said capstan in one direction and the other said capstan in an opposite direction to the first said capstan.

27. A retraction and extension mechanism according to claim 26 wherein said first cable engages only part of the periphery of said first capstan and engages only part of the periphery of said other capstan.

28. A retraction and extension mechanism according to claim 27 wherein said motor housing is pivotally attached to said mirror head and further comprising a spring acting between said mirror head and said motor housing that acts to tension said first cable and maintain the required degree of engagement of said first cable around said capstans to prevent slippage of said cable with respect to said capstans.

29. A retraction and extension mechanism according to claim 28 wherein said motor housing is caused to rotate against said spring should the movement of said mirror head be impeded.

30. A motor vehicle mirror on a vehicle with a mirror head that is extendable or retractable with respect to said vehicle comprising:

a mirror mounting bracket, a mirror head, a first tube projecting from said mounting bracket, a support projecting from said mirror head that locates into and slides back and forth within said first tube, a roller mounted with respect to said support, a cable, attached at one end with respect to said first tube at a point between said roller and said mirror head, and extending to and around said roller and into said mirror head, the other end of said cable extending into and attached with respect to said first tube, a capstan within said mirror head engaging said cable, and a motor to drive said capstan in either direction to cause said mirror head to extend or retract with respect to said mirror mounting bracket.

31. A motor vehicle mirror on a vehicle with a mirror head that is extendable or retractable with respect to said vehicle comprising:

a pair of spaced parallel first tubes, each attached at one end to, and projecting from, said mirror mounting bracket, a pair of spaced parallel supports, each attached to and projecting from said mirror head, that locate into and slide back and forth within said first tubes, a roller mounted with respect to one of said supports, a cable attached at one end with respect to said first tube within which said roller locates at a point between said roller and said mirror head, that extends to and around said roller and into said mirror head, the other end of said cable extending into and attached with respect to the other said first tube, a capstan within said mirror head engaging said cable, and a motor to drive said capstan in either direction to cause said mirror head to extend or retract with respect to said mirror mounting bracket.

32. A motor vehicle mirror on a vehicle with a mirror head that is extendable or retractable with respect to said vehicle comprising:

a pair of spaced parallel first tubes, each attached at one end to, and projecting from, said mirror mounting bracket, a pair of spaced parallel supports, each attached to and projecting from said mirror head, that locate into and slide back and forth within said first tubes, a roller mounted with respect to each of said supports, a first cable attached at one end with respect to one of said first tubes at a point between said roller and said mirror head, that extends into said mirror head, the other end of said first cable extending into the other said first tube, around said roller in the other said first tube and fixed to the other said first tube at a point between said roller and said mirror head, a second cable attached at one end to said one of said first tubes, at a point between said roller and said mirror head, and extending to and around said roller and into said mirror head, the other end of said second cable extending into and attached with respect to said other said first tube, a capstan within said mirror head engaging said first cable, and a motor to drive said capstan in either direction to cause said mirror head to extend or retract with respect to said mirror mounting bracket.

* * * * *